United States Patent
Kao et al.

[11] Patent Number: 5,829,585
[45] Date of Patent: Nov. 3, 1998

[54] GOLF CLUB TRANSPORATION DEVICE

[76] Inventors: David T. Kao; Theresa S. Kao, both of 2615 Lindenwood Cir., Ames, Iowa 50010

[21] Appl. No.: 612,106

[22] Filed: Mar. 7, 1996

[51] Int. Cl.[6] ........................ A63B 55/00; A63B 55/06; A63B 55/08
[52] U.S. Cl. .................. 206/315.3; 206/315.7; 206/315.8; 248/96; 280/646; 280/DIG. 6
[58] Field of Search .............. 206/315.3–315.8; 280/DIG. 6, 646, 37; 248/96

[56] References Cited

U.S. PATENT DOCUMENTS

| | | | |
|---|---|---|---|
| 1,978,230 | 10/1934 | Schutes | 248/96 |
| 3,079,166 | 2/1963 | Abgarian | 248/96 X |
| 3,489,426 | 1/1970 | Bond | 280/DIG. 6 X |
| 3,985,373 | 10/1976 | Widegren | 280/DIG. 6 X |
| 4,522,299 | 6/1985 | Clark et al. | 206/315.3 |
| 4,620,682 | 11/1986 | Yim | 280/DIG. 6 X |
| 4,767,001 | 8/1988 | Kim | 206/315.3 |
| 4,792,152 | 12/1988 | Carolan | 280/DIG. 6 X |
| 4,822,071 | 4/1989 | Widegren | 280/DIG. 6 X |
| 5,236,085 | 8/1993 | Quellais | 206/315.7 |
| 5,470,095 | 11/1995 | Bridges | 280/DIG. 6 X |

*Primary Examiner*—Sue A. Weaver
*Attorney, Agent, or Firm*—Zarley, McKee, Thomte, Voorhees & Sease

[57] ABSTRACT

A golf club transportation device has an elongated tubular golf club bag which has an open top, a closed bottom, and an elongated substantially cylindrical golf club compartment. A support frame is rigidly fixed to the bag and includes a movable support mechanism to hold the bag substantially upright when the bottom of the bag engages a supporting surface. The support mechanism is movably secured to the support frame and is movable between an extended position holding the bag in an upright position, and a collapsed position generally parallel to the bag. A spring actuated control means is on the support frame and serves to move the support mechanism to an extended position when the bottom of the bag is out of engagement with a supporting surface. The wheels of the device are detachable so that the bag can use the support frame to hold it upright when the bag is in its carrying mode.

5 Claims, 7 Drawing Sheets

GOLF CLUB TRANSPORATION DEVICE

BACKGROUND OF THE INVENTION

Golf clubs are normally carried in a golf bag using a shoulder strap. Some players prefer to walk during the game, and carry a lighter bag with a support stand. Others chose to mount the bag on a pulling cart in order to avoid the burden of carrying the bag. Existing carts are separate from the golf bag and it is necessary to mount the bag on the cart when the cart is being used. The pulling carts are normally of heavy construction which is dictated by their stand-alone structure. They therefore become an additional burden, especially when walking up and down steep paths.

It is therefore a principal object of this invention to affix the bag to the cart structure whereby the stiffness of the golf bag is used as an integral part of the cart structure.

A further object of this invention is to make the golf bag and the cart structure of integral construction wherein the cart can be comprised of very light weight materials while still providing the required structural strength in conjunction with the bag.

A still further object of this invention is to provide a golf club carrier which eliminates the need for the user to mount a separate golf bag on a separate cart, and then dismounting the same when the game is completed.

A still further object of this invention is to provide a combined golf bag and cart which can be easily carried if the user wishes to carry the bag rather than to pull the combined bag and cart structure.

A still further object of this invention is to provide a golf club carrier which has a supporting stand when the unit is used in a standing mode, and which can also be used as a pulling cart when operated in an extended and moving mode.

A still further object of this invention is to provide a golf club carrier which has a supporting frame to be used to both support the bag in a standing position, or to support the bag when in a pulling mode wherein the support mechanism automatically extends to an operating position, and collapses to a inoperative position when its function is not required.

These and other objects will be apparent to those skilled in the art.

SUMMARY OF THE INVENTION

The golf club transportation device of this invention has an elongated tubular golf club bag which has an open top, a closed bottom, and an elongated substantially cylindrical golf club compartment. A support frame is rigidly fixed to the bag and includes a movable support mechanism to hold the bag substantially upright when the bottom of the bag engages a supporting surface. The support mechanism is movably secured to the support frame and is movable between an extended position holding the bag in an upright position, and a collapsed position generally parallel to the bag. A spring actuated control means is on the support frame and serves to move the support mechanism to an extended position when the bottom of the bag is out of engagement with a supporting surface. The wheels of the device are detachable so that the bag can use the support frame to hold it upright when the bag is in its carrying mode.

DESCRIPTION OF THE PREFERRED EMBODIMENT

Figure 1:
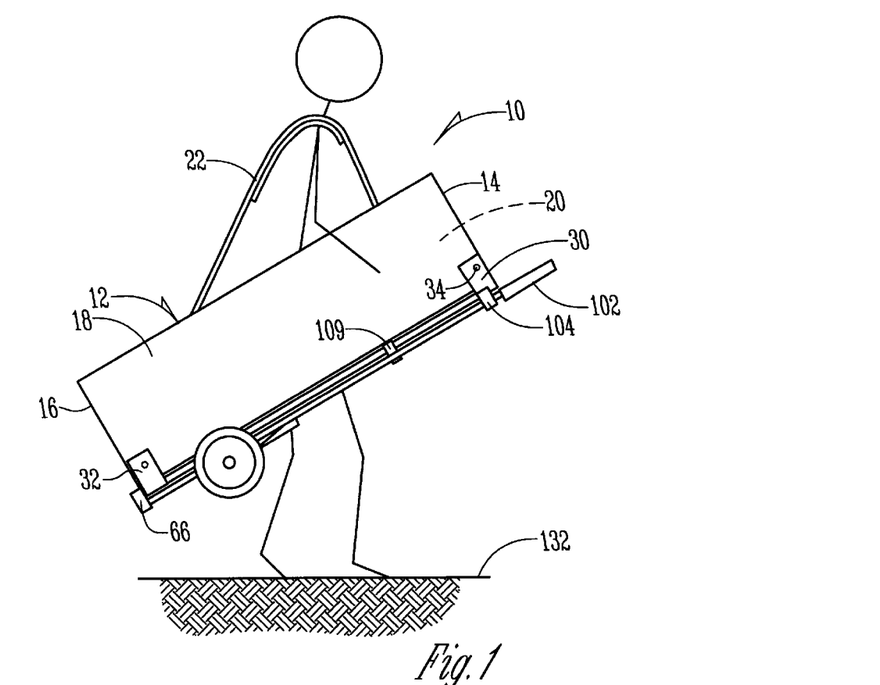
FIG. 1 is a side elevational view of the device of this invention in its carrying mode.

The golf club carrier of this invention is comprised of a bag 12, an open top 14, a closed bottom 16, a cylindrical body 18 having a central compartment 20 for receiving a plurality of golf clubs, and a conventional shoulder strap 22, FIG. 1. The strap 22 is to permit the golfer to carry the bag 12 in a shoulder support position.

The carrier 10 has a support frame 24 (FIG. 11) which includes a support mechanism 26 and a wheel assembly portion 28. Details of components 24, 26 and 28 will be described more specifically hereafter.

Figure 11:
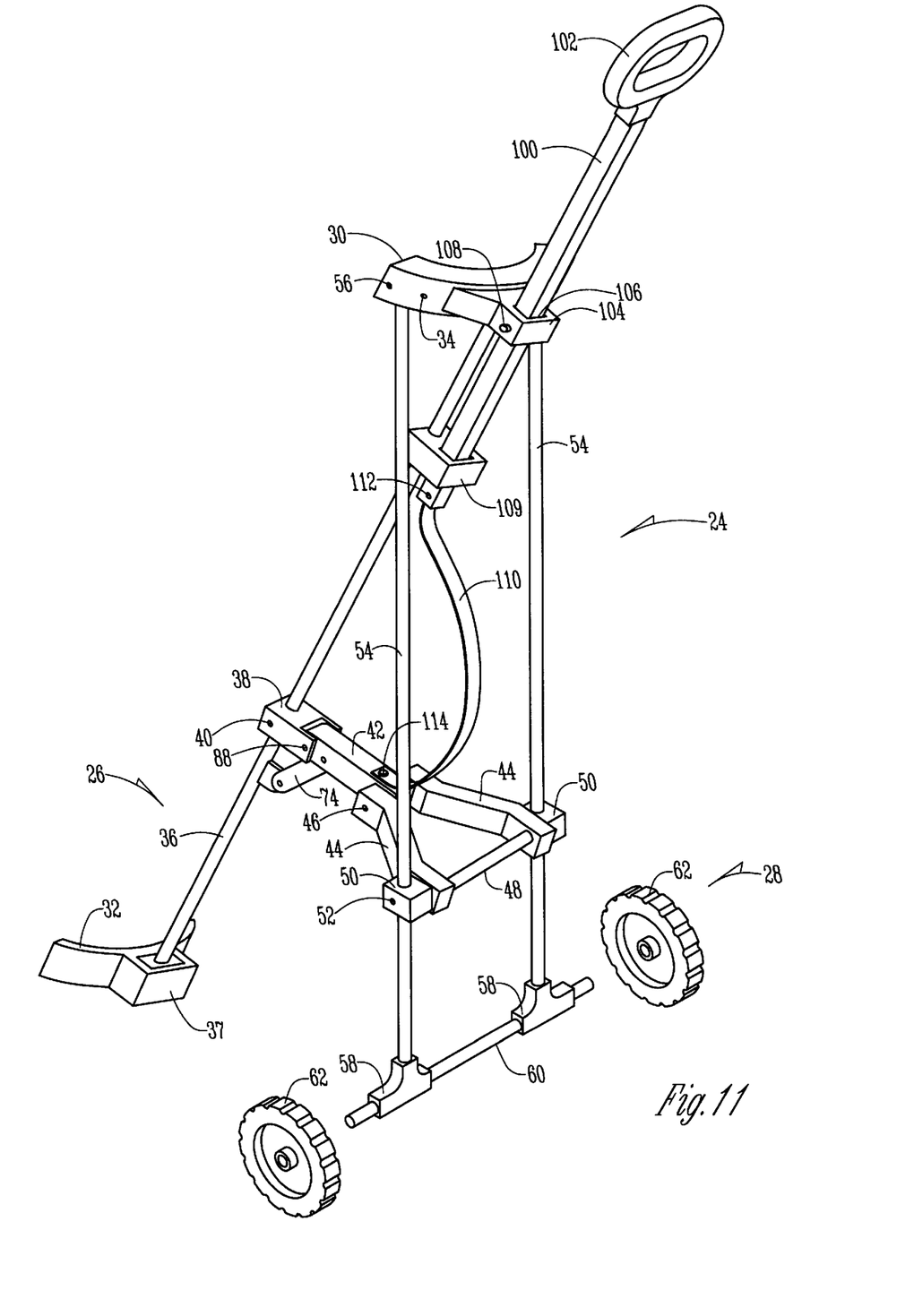
FIG. 11 is a large scale perspective view of the wheel assembly portion of the support frame.

Support frame 24 includes an upper collar 30 and a lower collar 32 which are rigidly secured to bag 12 by fasteners 34 (FIG. 11). A base tube 36 has its upper end secured in collar 30 and tube 36 extends downwardly therefrom, and its lower end terminates in support block 37 which is a part of collar 32 members 30, 32, 34, and 36 comprise a non-movable support frame assembly. A clevis 38 (FIGS. 7–11) is rigidly secured by pin 40 to tube 36. An inverted channel shaped arm 42 extends rearwardly from clevis 38 and is pivotally connected to the inner end of yoke arms 44 by pin 46. A horizontal tube 48 (FIG. 11) extends between the outer ends of yoke arms 44. The outer ends of tube 48 are rotatably secured within support blocks 50 which are rigidly secured by pins 52 to the elongated support tubes 54. The support tubes 54 are pivotally secured to upper collar 30 by pins 56.

Axle support blocks 58 (FIG. 11) are rigidly secured to the lower ends of tubes 54 and support horizontal axle 60. Support wheels 62 are rotatably secured to the outer ends of axle 60.

With reference to FIGS. 7–11, an elongated control rod 64 has a shoe 66 rigidly secured to the lower end thereof. A bushing 68 surrounds the lower end of rod 64 and is rigidly secured thereto. Rod 64 has a shallow elongated slot 70 therein (FIG. 7) into which is inserted an edge of support element 72. Support element 72 is thereupon welded to bushing 68.

A pair of elongated links 74 are connected to element 72 by means of pin 76 which extends through aperture 78 in element 72 and registering apertures 80 in the lower ends of links 74.

A pin 82 extends through apertures 84 in the upper ends of links 74 and extends through apertures 86 in arm 42 to pivotally connect the arm 42 to the links. A pin 88 pivotally secures the inner end of arm 42 to the outer end of clevis 38 by extending through apertures 90 (FIG. 7) in the inner end of arm 42 and the apertures 92 in the outer end of clevis 38.

Figures 7, 8:
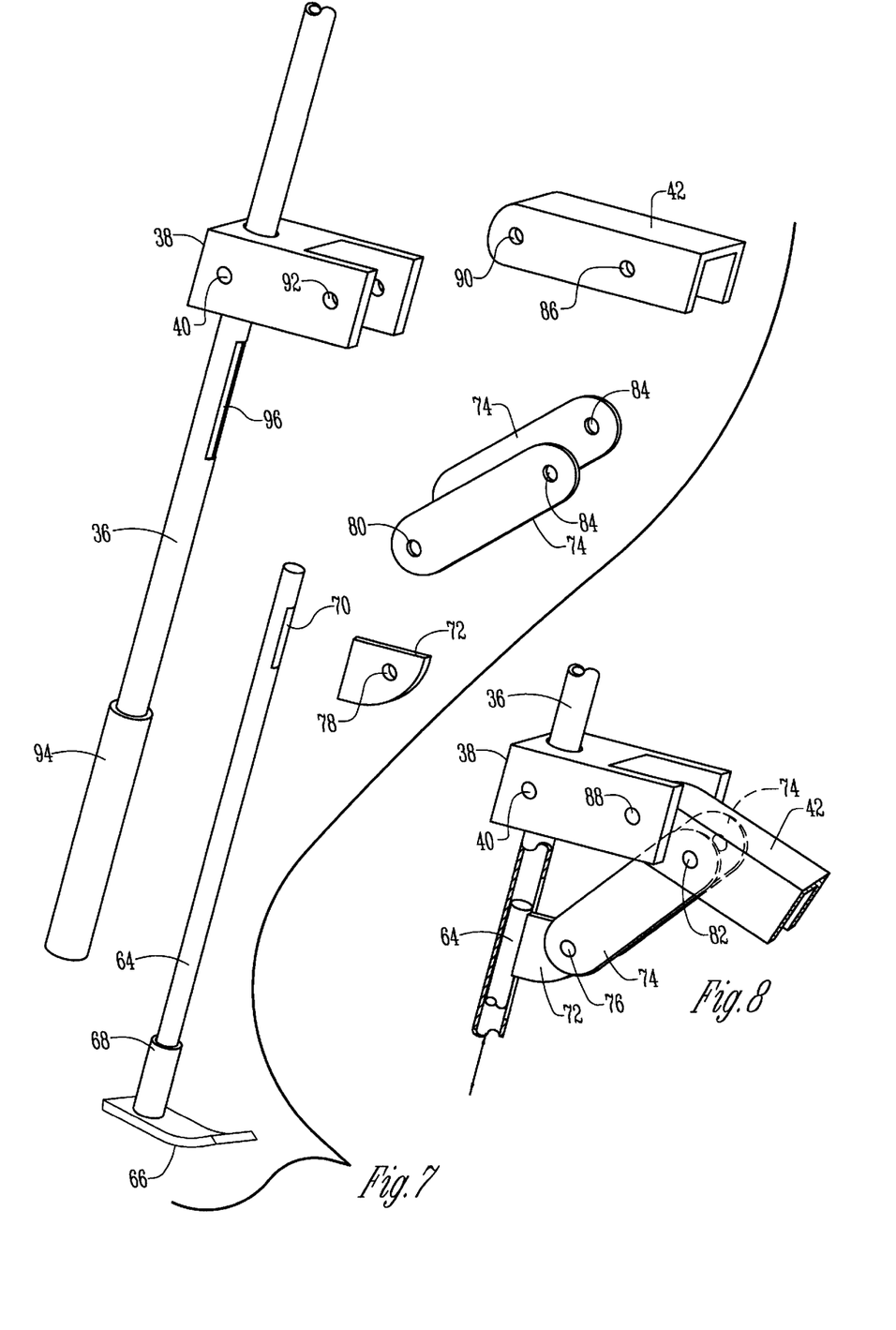
FIG. 7 is a large scale exploded perspective view of the support mechanism which causes the support frame to extend and collapse.
FIG. 8 is a partial sectional view of the assembled components of FIG. 7.
Figures 9, 10:
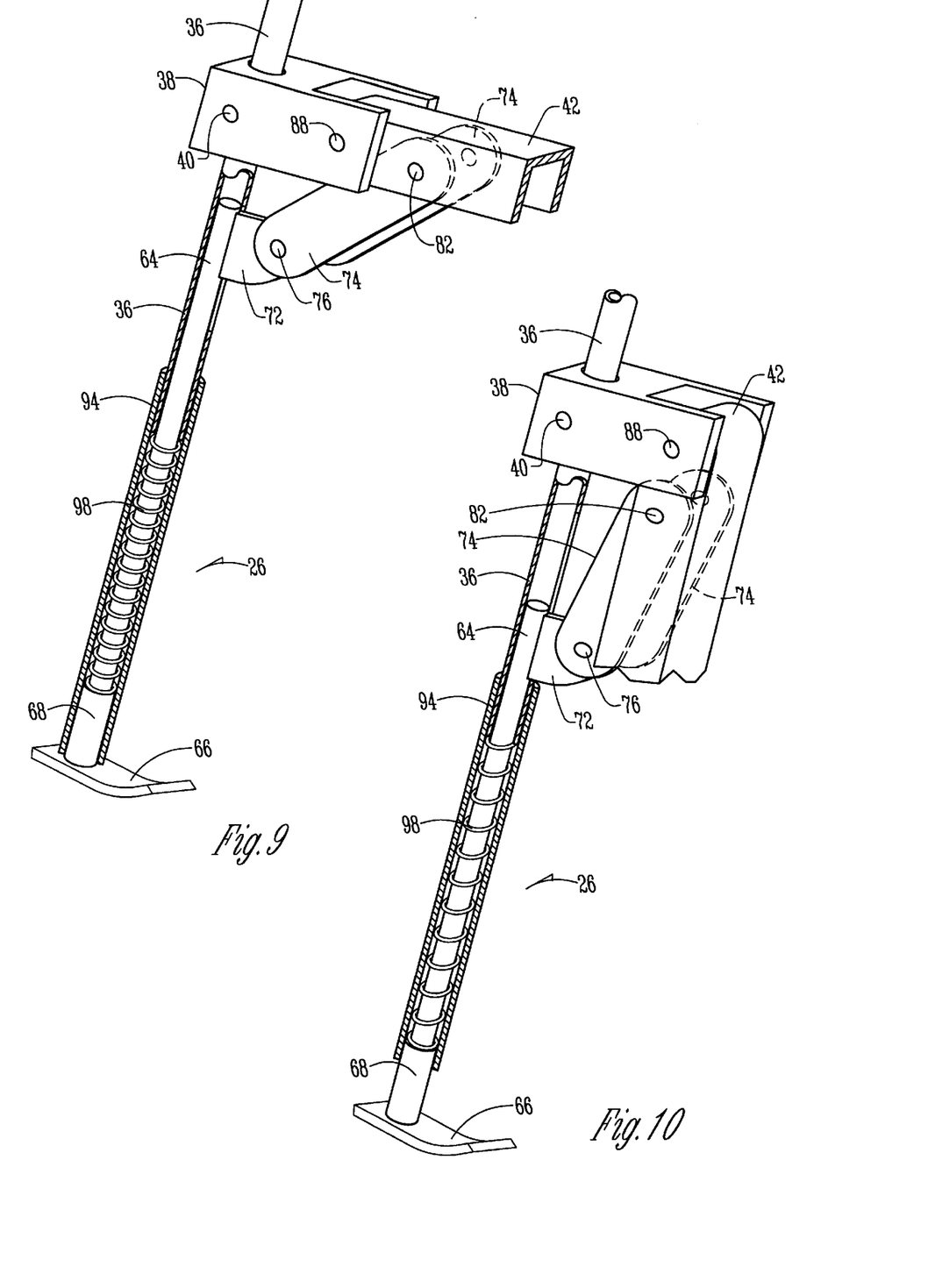
FIG. 9 is a partial sectional view of the assembled components of FIG. 7 when the support frame is in the positions of either FIGS. 4, 5 or 6.
FIG. 10 is a view similar to that of FIG. 9 wherein the components of FIG. 7 are in the position of FIG. 1 wherein the support frame has moved to its collapsed position.

With reference to FIGS. 7, 9 and 10, a sleeve 94 is rigidly secured to the lower end of tube 36. An elongated slot 96 in tube 36 (FIG. 7) slidably receives the element 72, and its length defines and controls the upward and downward movement of the elements 72 and the rod 64. A compression spring 98 (FIGS. 9 and 10) surrounds the lower portion of rod 64. The upper end of spring 98 engages the lower end of tube 36 within the tube 94. The lower end of spring 98 engages the upper end of sleeve 68.

A handle 100 (FIG. 11) has a hand grip 102 on the upper end thereof. Handle 100 slidably extends through support block 104 which is connected to the upper collar 30. The handle slidably extends through aperture 106 in block 104. Its slidable position within the block 104 is controlled by conventional detent 108 (FIG. 11). A second support block 109 (FIGS. 1 and 2) is rigidly secured to tube 36 and slidably receives through a suitable aperture (not shown) the lower end of handle 100.

Figure 6:
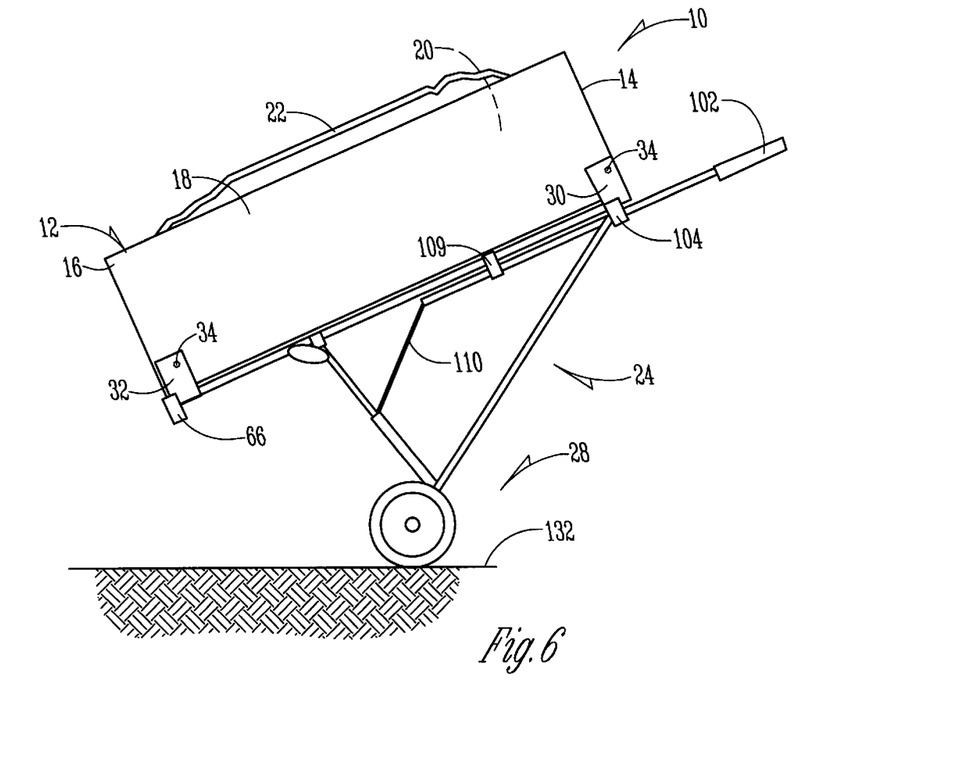
FIG. 6 is the device of FIG. 5 in its pulling mode.

A flexible strap 110 has its upper end secured by pin 112 through the lower end of handle 100. The other end of strap 110 is secured by pin 114 to the outer end of arm 42 (FIG. 11). Strap 110 is flexible in nature but has sufficient tensile strength to prevent any collapse of the support frame 24 when the carrier 10 is in the position shown in FIG. 6.

Figures 12, 13:
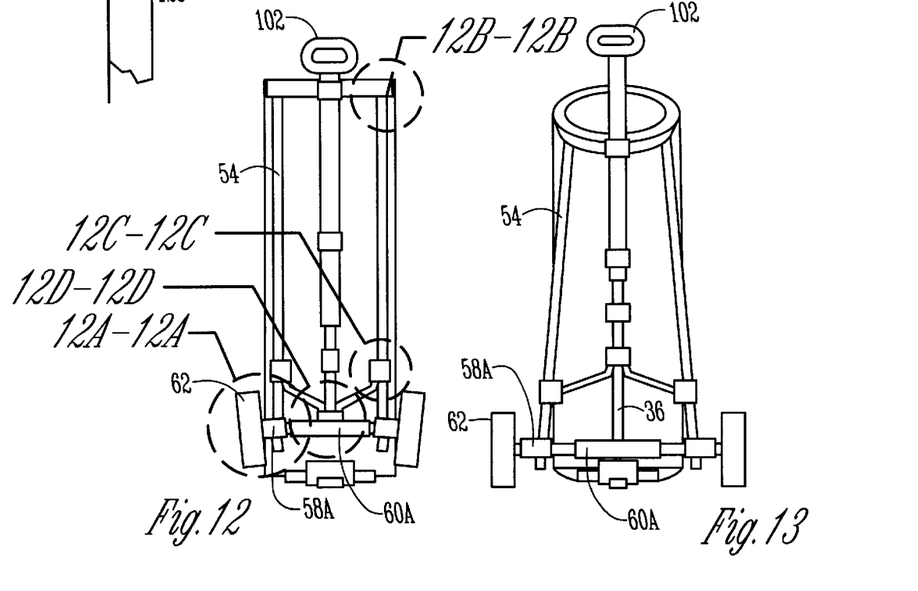
FIG. 12 is a front elevational view of an alternate form of the invention.
FIG. 13 is a view similar to that of FIG. 12 wherein the wheels have been moved to their laterally extended position.
Figure 12A:
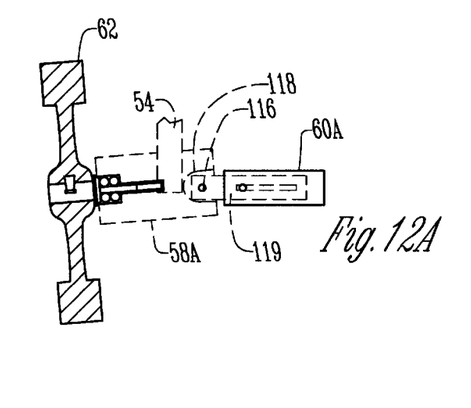
FIG. 12A is a partial sectional view at an enlarged scale taken on line 12A—12A of FIG. 12.

An alternate form of the invention is shown in FIGS. 12–13. With reference to FIG. 12A, a support block 58A is secured to the lower end of each tube 54. An axle member 60A, through pin 116 in cavity 118, is secured to axle extension 119 which is mounted for restrictive slidable movement in axle 60A. This structure permits the wheels 62 to move away from each other when the wheel assembly 28 is moved to an extended position (FIG. 13), and permits the wheels to move towards each other when the wheel assembly is moved to a retracted position as shown in FIG. 12. This is accomplished essentially by the slidable action between axle extension 119 and axle 60A.

Figure 12B:
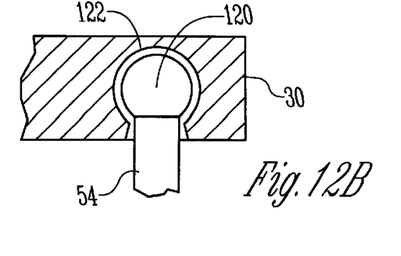
FIG. 12B is an enlarged scale sectional view taken on line 12B—12B of FIG. 12.

With reference to FIG. 12B, the upper ends of tubes 54 are pivotally and rotatably mounted in collar 30 by means of a ball 120 on the upper end of arms 54 mounted within the sockets 122.

Figure 12C:
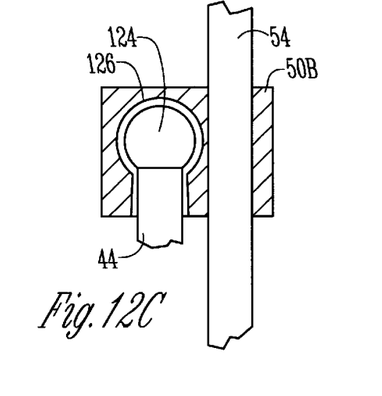
FIG. 12C is a partial enlarged scale sectional view taken on line 12C—12C of FIG. 12.

With reference to FIG. 12C, the outer ends of yoke arms 44 are pivotally and rotatably secured to the support blocks 50B which are mounted on tubes 54. This is accomplished by means of ball 124 on the outer ends of yoke arms 44 wherein the balls 124 are mounted within cavities 126.

Figure 12D:
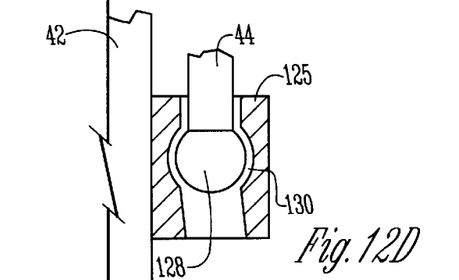
FIG. 12D is a partial sectional view taken on line 12D—12D of FIG. 12.

With reference to FIG. 12D, the inner ends of yoke arms 44 are pivotally and rotatably secured to arm 42 by means of a support block 125 secured to the arms 42, and by means of a ball 128 on the inward end of arms 44 which is nestled within sockets 130 in the block 125.

DESCRIPTION OF THE OPERATION OF THE INVENTION

Figure 4:
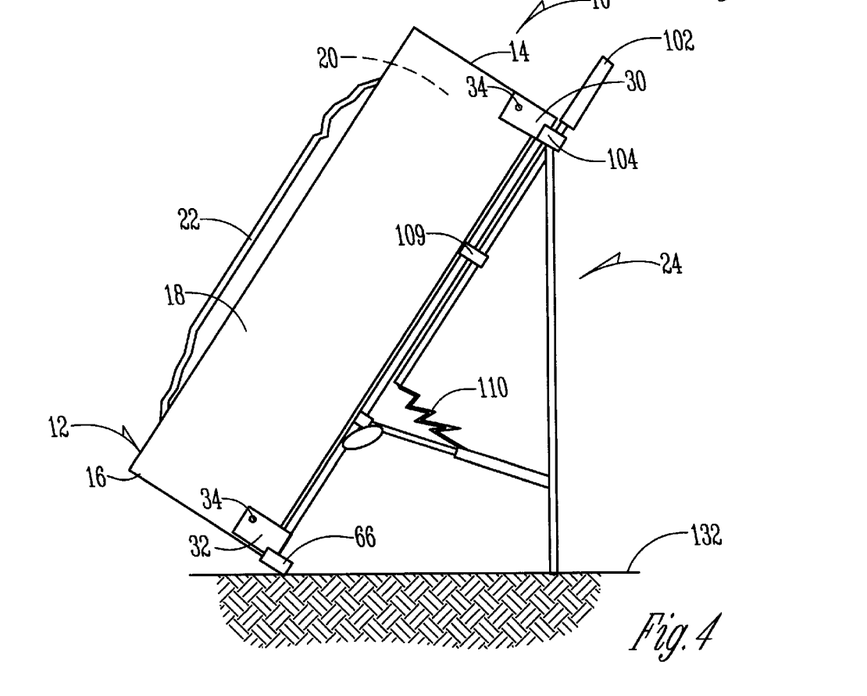
FIG. 4 is the device of FIG. 3 wherein the wheels have been removed from the support frame.

When the carrier 10 is used either in the shoulder carrying mode of FIG. 1 and/or the non-pulling cart mode of FIG. 4, the wheels 62 can be removed from the supporting axle 60 or 60A so that the lower ends of tubes 54 can engage the ground surface 132 for support purposes.

FIGS. 1 through 4 indicate the position of the components of the carrier wherein the handle 100 is withdrawn and the bag 12 is carried and vertically supported (FIGS. 3 and 4) with or without the wheels being mounted.

It will be noted that when the carrier is being carried as in FIG. 1, the compression spring 98 moves rod 64 to the position of FIG. 10. This permits the rod 64 and the element 72 to pull the lower ends of links 74 downwardly which in turn pivots arm 42 downwardly from its pivotal connection to clevis 38. This causes the entire support mechanism 26 and the wheel assembly portion 28 to fold into the collapsed position shown in FIG. 1.

Figure 2:
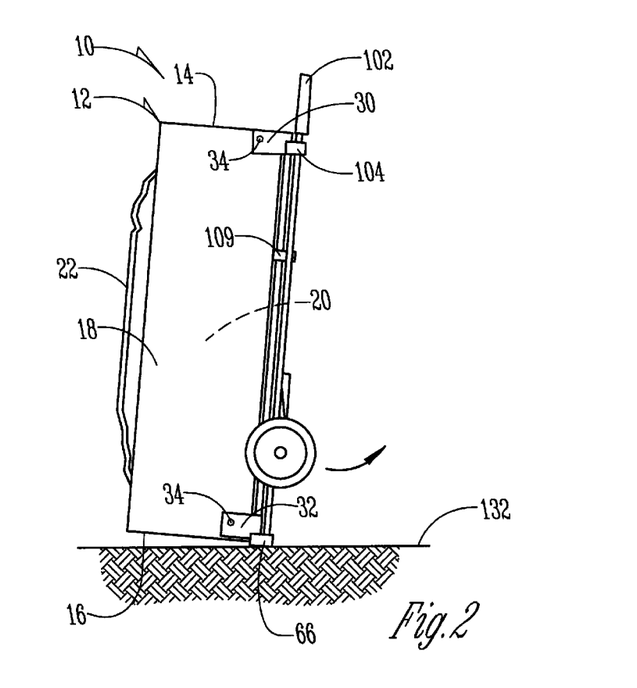
FIG. 2 is a side elevational view of the device of FIG. 1 when it is positioned on a supporting surface to cause the support frame to extend.
Figure 3:
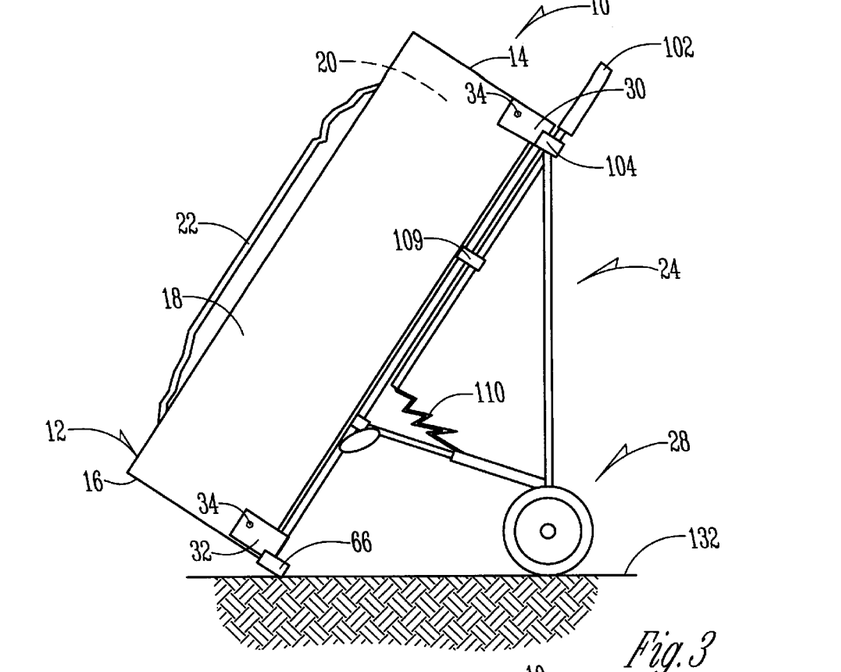
FIG. 3 is the device of FIG. 2 when the support frame has been extended.

However, when the carrier 10 is deposited on the ground supporting surface 132 as shown in FIG. 2, the shoe 66 moves towards the bottom of the bag by reason of the weight of the bag itself. As the shoe moves from the position of FIG. 10 to the position of FIG. 9, element 72 moves upwardly in slot 96 and causes the lower ends of links 74 to move upwardly. This in turn pivots the arm 42 upwardly to the position of FIG. 9 whereupon the support mechanism 26 and wheel assembly 28 are in their extended position. Thus, the carrier 10 will be in a fully supported position (FIGS. 3 or 4).

When it is desired to move the carrier to its pulling or transport position, (FIGS. 5 and 6) the handle 100 is moved to the extended position of these two figures. The support mechanism 26 and wheel assembly 28 are moved to their extended position from the position of FIG. 2 in the same manner as described above. However, the extended position of the handle 100 causes the strap 110 to move to the extended or taut position shown in FIGS. 5 and 6. There is no tendency for the support mechanism 26 or the wheel assembly portion 28 to move to a collapsed position when the carrier is in its resting position of FIG. 5. However, when moved to the transport position of FIG. 6, the spring 98 is attempting to move the rod 64 from the compressed position of FIG. 9 to the extended position of FIG. 10. However, the taut position of strap 110 (FIG. 6) prevents arm 42 from pivoting downwardly, and therefore the strap prevents the compression spring from moving the rod 64 from the position of FIG. 9 to the position of FIG. 10.

Figure 5:
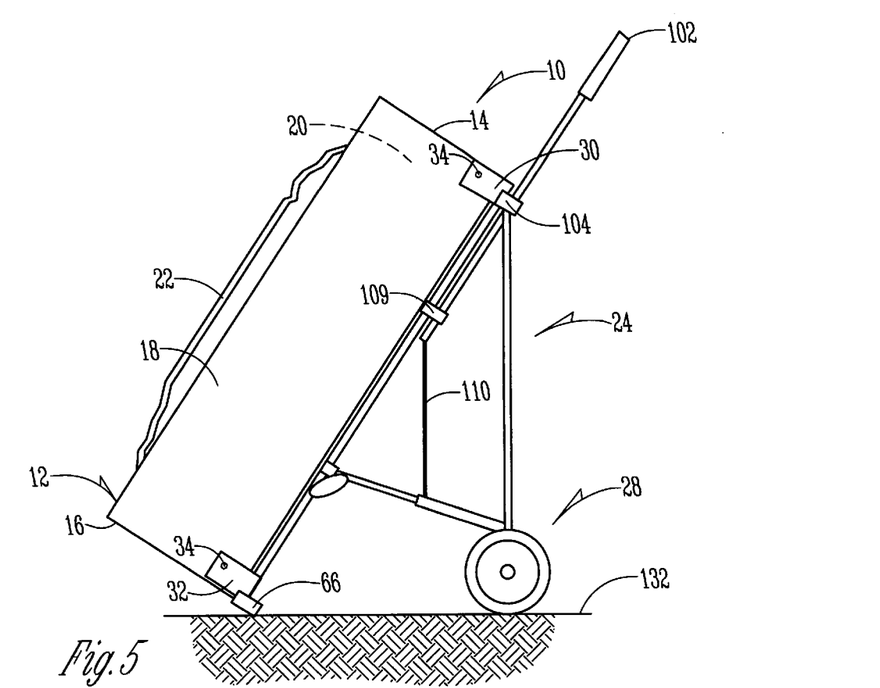
FIG. 5 is the device of FIG. 3 wherein the handle has been extended to convert the device to the pulling mode.

With reference to the modified structure shown in FIGS. 12–13, the movement of the support mechanism 26 and the wheel assembly 28 from the collapsed position, such as typified by FIG. 2, to the extended position, such as typified by FIG. 5, causes the lower ends of tubes 54 to pivot outwardly and away from each other. The lower ends of tubes 54 are permitted to move laterally away from each other by reason of the sliding action of axle extension 119 in axle 60A as described above.

To complement this action, the eccentric mounting of the ends of yoke arms 44 in blocks 50B and 125 (FIGS. 12C and 12D, respectively) further enhance the extended position of the wheels 62. The fully extended position of the wheels 62 is best shown in FIG. 13. This obviously adds greater stability to the carrier 10 while it is being pulled, or while it is free standing. The collapsed position of the wheels 62 as shown in FIG. 12 makes the device easier to carry as shown in FIG. 1.

The integral construction of the bag 12 and the support frame 24 permits the strength of the bag to complement the strength of the support frame 24 wherein the frame 24 can be fabricated of much lighter construction. The integral construction of the bag and the support frame 24 also makes it unnecessary to detachably remove the bag from the frame of a cart which is a nuisance inherent in existing golf carts.

It is therefore seen that this invention will achieve at least all of its stated objectives.

What is claimed is:

1. A golf club transportation device, comprising, an elongated tubular golf club bag having an open top, a closed bottom and an elongated substantially cylindrical golf club compartment therein, a non-movable frame assembly rigidly secured to said bag, a movable support mechanism movably secured to said support frame assembly and movable between a collapsed condition adjacent said bag to an extended supporting position outwardly from said bag, spaced wheels secured to said support mechanism, said support frame assembly including a ground engaging spring loaded member operatively connecting said support frame assembly and said support mechanism to move said support mechanism to said collapsed position when said spring loaded member is out of engagement with the ground, and to move said support mechanism to said extended supporting position when said spring loaded member is in engagement with the ground, and an override handle element for manually pulling said bag releasably and slidably connected to said support frame assembly between an extended pulling position and a retracted non-pulling position; said handle element being operatively connected to said spring loaded member and said support frame assembly to prevent said spring loaded member from moving said support mechanism to said collapsed position when said handle element is in its extended position.

2. The device of claim 1 wherein said spaced wheels are mounted on said support mechanism by an eccentric support system whereby the spacing between said wheels increases when said support mechanism is moved to said extended position.

3. The device of claim 1 wherein a shoulder carrying strap is secured to said bag.

4. The device of claim 1 wherein said ground engaging spring loaded member is an elongated rod extending substantially parallel to said bag and having upper and lower ends, a foot on the lower end of said rod and extending beyond the lower end of said bag to engage a supporting surface when the lower end of said bag engages a supporting surface, whereupon the weight of said bag will push said foot in an upwardly direction, a spring means connecting said rod and said support frame assembly normally moving said rod in a downwardly direction, limit means on said support frame assembly to limit the upward and downward movement of said rod, and linkage means connecting said rod and said support mechanism to extend said support mechanism outwardly from said bag when said rod is in its upward position, and to move said support mechanism to a collapsed position adjacent said bag when said rod is in its downward position.

5. The device of claim 1 wherein said handle member is operatively connected to said spring loaded member by an elongated flexible member.

\* \* \* \* \*